Nov. 25, 1969  SHIZUKA HORII  3,480,892
ELECTROMAGNETIC RELAY FOR SWITCHING AN ELECTRIC CIRCUIT
Filed July 3, 1967  7 Sheets-Sheet 1

INVENTOR
Shizuka Horii
BY Wenderoth, Lind & Ponack
ATTORNEYS

Nov. 25, 1969　　　　　SHIZUKA HORII　　　　　3,480,892
ELECTROMAGNETIC RELAY FOR SWITCHING AN ELECTRIC CIRCUIT
Filed July 3, 1967　　　　　　　　　　　　　　　7 Sheets-Sheet 2

INVENTOR
Shizuka Horii
BY Wenderoth, Lind & Ponack
ATTORNEYS

Nov. 25, 1969 SHIZUKA HORII 3,480,892
ELECTROMAGNETIC RELAY FOR SWITCHING AN ELECTRIC CIRCUIT
Filed July 3, 1967 7 Sheets-Sheet 5

INVENTOR
Shizuka Horii,
BY Wenderoth, Lind & Ponack,
ATTORNEYS

3,480,892
ELECTROMAGNETIC RELAY FOR SWITCHING AN ELECTRIC CIRCUIT
Shizuka Horii, Shiga Prefecture, Japan, assignor to Tateisi Electronics Co., Kyoto, Japan
Filed July 3, 1967, Ser. No. 650,873
Claims priority, application Japan, July 7, 1966, 41/44,583; Dec. 19, 1966, 41/115,515
Int. Cl. H01h 67/02
U.S. Cl. 335—132                                                                7 Claims

ABSTRACT OF THE DISCLOSURE

An improved electromagnetic relay for switching an electric circuit, comprising a case of insulating material having a shoulder dividing the interior of the case into an upper space and a lower space, an electromagnetic unit in the lower space having movable and stationary cores, an electromagnetic coil and a frame, partition walls extending upwardly from the shoulder separating the upper space into cavities, a movable contacting member support in each of the cavities reciprocally movable in the vertical direction along the partition walls. An upper movable contacting member and a lower movable contacting member having a spring extending between them are disposed in an element receiving section in each of the supports. Lower stationary contacting members corresponding to the lower movable contacting members are mounted on respective seats on the shoulder, and further springs are mounted in the respective movable contact member supports and urge the movable contacting member support against a core cap mounted on the movable core of the electromagnetic unit. There are provided upper stationary contacting members corresponding to the upper movable contacting members and which are mounted in a readily movable manner on connecting members connecting each partition wall above the shoulder. Each upper stationary contacting member is fitted onto a flange of a receiving member so as to prevent the receiving member from being removed upwardly from the cavity, and a return spring is provided in the electromagnetic unit to press the movable contacting supports and movable core upwardly against the springs which press these supports against the core cap.

---

This invention relates to an improvement in a device for switching of an electric circuit, and more particularly to an improvement of an electromagnetic relay which conducts switching of an electric circuit by electromagnetic force.

Control circuits for controlling machine tools and similar instrument are extremely complex and a large number of controlling contacts are required which are subject to repeated switching. As those controlling contacts the contacts of electromagnetic relays are commonly employed. The contacts in electromagnetic relays, however, wear out easily through repeated switching, and if left unrepaired, reliable switching of the controlling circuit to control can no longer be performed. Accordingly, electromagnetic relays used for switching complex controlling circuits must be provided with contact units which are replaceable readily and simply. In addition, since electromagnetic relays are installed together with other instruments, on a panel and the like there is a limit to the space available, so that they must also be compact in size.

Furthermore, it is desirable that the electromagnetic relays should not only be provided with a force for breaking contact which is greater than that of the conventional type, but also for a highly reliable operation they should also be free from deformation by the arc.

Electromagnetic relays, moreover, must meet such requirements as follows: protection of the contacting member against dust to ensure a longer service life, resistance against shock and vibration so as to avoid erroneous operations, reduction in the number of parts to facilitate assembly and to lower the cost of production.

The main object of this invention is to provide an electromagnetic relay which fulfills the requirements mentioned above.

An object of the invention is to make a movable contacting member and a stationary contacting member simultaneously replaceable without disturbing the rest of the assembly, to make either of said contacting members separately replaceable, and to make it possible to facilitate the replacement, repair, maintenance thereof through an operation from above the case.

Another object of the present invention is to provide an electromagnetic relay having a group of contacting members and relatively greater force for breaking contact, although the relay is compact in size.

According to the invention, since a movable contacting member is held in an element receiving section provided with a movable contacting member support, and a stationary contacting member corresponding to a movable contacting member is held in the case, there is between the movable contacting member and a partition wall of the case no insulation other than the movable contacting support. In this invention, therefore, a wide space thus created between the partition wall and the movable contacting member makes it possible to make the size of the movable contacting member larger than that of the conventional type mounted in the same case.

The increase in breaking force, and a remarkably easy replacement of both contacting members and other handling procedures are thus obtained. In other words, when the breaking force is the same, the electromagnetic relay of the invention can be made more compact than those heretofore in use.

Another object of the invention is to have an electromagnetic relay which is troubleproof with respect to shock, vibration and the like.

According to the invention, as an electromagnetic unit and a contact switching assembly are each mounted separately, they are kept in mechanical contact only through the pressure transmitting relation, so that when the electromagnet is energized, the electromagnetic unit and the switching assembly are in completely separate states, and accordingly the shock and vibration owing to the beat of the electromagnet is not conveyed to the contact switching assembly.

Another object of this invention is to provide an electromagnetic relay wherein only a defective contacting member can readily be replaced without disassembling the other normally operating contacting members.

Another object of the invention is to provide an electromagnetic relay which is made durable and serviceable over a long period through the extinction of arc generated.

Another object of the invention is to provide an electromagnetic relay in which the number of parts is reduced to the essential ones, and in which the electromagnetic coil frame is resiliently held in place.

Another object of the invention is to provide an electromagnetic relay wherein the contacting member assembly is protected against dust and droplets of water to avoid troubles due to improper contact and short circuiting.

While other objects and effects of the invention will be disclosed in the figures of the drawing, the invention is not limited by the hereinafter described embodiments and figures, but all the embodiments pertaining to technical concepts thereof are also included.

FIG. 8 is a perspective view showing the disassembled contact unit of an electromagnetic relay provided with an A contact embodying the invention;

FIG. 13 is a perspective view showing a disassembled electromagnetic unit of an electromagnetic relay embodying the invention.

Figure 1:
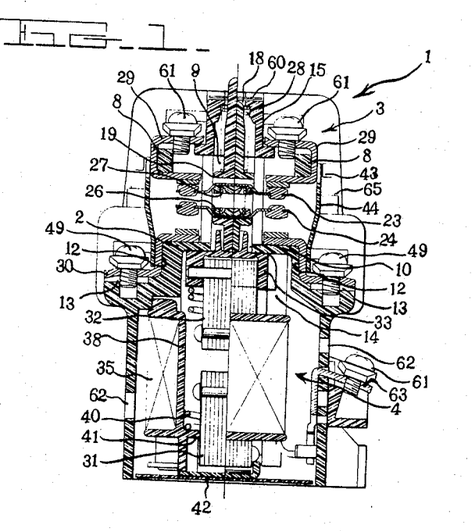
FIG. 1 is a view in cross section of an electromagnetic relay having A, B contacts in accordance with the invention as viewed along the line A–B–O–C in FIG. 3.
Figure 2:
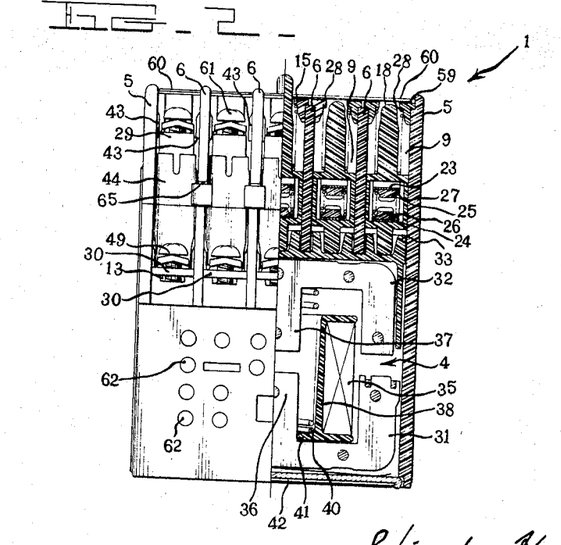
FIG. 2 is a view of the relay of FIG. 1 in cross section along the line C–O–D in FIG. 3.
Figure 3:
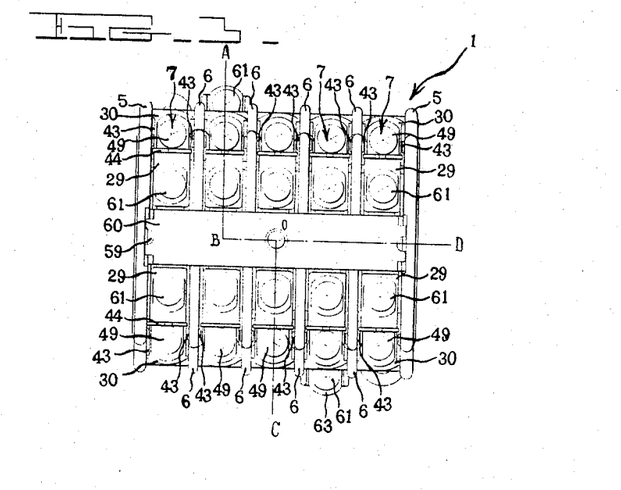
FIG. 3 is a plan view of an electromagnetic relay embodying the invention shown in FIG. 1.

Referring to FIGS. 1 to 3, a case 1 made of insulating material is divided by a shoulder 2 into an upper space 3 and a lower space 4. The upper space 3 provides cavities 7, 7, 7, 7 and 7, which are respectively formed between a pair of side walls 5, 5 by partition walls 6, 6, 6 and 6 extending upwardly from the shoulder 2. To connect each of said partition walls 5 a pair of connecting members 8 are provided. In the middle portion of each cavity 7, there is a section 9 for receiving a movable contacting member support. The bottom of each said section 9, namely the shoulder, has therein a hole 10 for receiving a downwardly projecting rod of a movable contacting member support. The shoulder 2 comprises L-shaped portions 12, 12 provided on both sides thereof and seats 13 for receiving lower stationary contacting members which consist of one group of said seats and another group thereof. In the lower space 4 an electromagnetic unit is disposed. Said shoulder 2 provides a recessed section 14 which holds a movable core.

Figure 7:
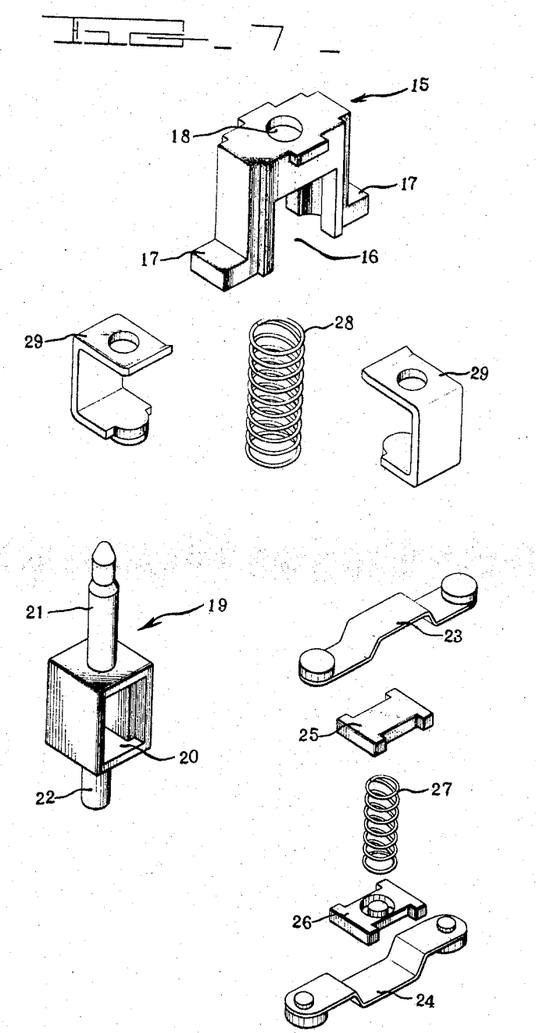
FIG. 7 is a perspective view showing the disassembled contact assembly of an electromagnetic relay provided with A, B contacts embodying the invention.

Referring to FIG. 7, a spring receiving member 15 made of insulating material consists of a spring receiving section 16, a pair of flanges 17, 17, and a threaded hole 18 for receiving the guiding rod of a movable contacting member support. A movable contacting member support 19 comprises an element receiving section 20, said guiding rod 21 and a downwardly projecting rod 22. Inside said element receiving section 20 are provided an upper movable contacting member 23, a lower movable contacting member 24, and between a pair of those contacting members a spring 27 through insulating members 25 and 26 interposed respectively between each contacting member and each end of spring. The movable contacting member support 19 is mounted in each of the sections 9 for receiving a movable contacting member support. The assembly of these elements is performed by inserting the downwardly projecting rod 22 into the receiving hole 10 in the shoulder 2, setting a spring 28 around the guiding rod 21, placing the guiding rod 21 and the spring 28 within said section 16 of the spring receiving member 15, mounting said receiving member 15 in said section 9, and getting said rod 21 inserted into threaded hole 18. Said support 19 is movable along said partition walls 6 in vertically reciprocating motion.

On each of connecting members 8, laterally extending U-shaped upper stationary contacting members 29 and 29 are removably mounted symmetrically to each other, and the upper edge of each upper stationary contacting member 29 is fitted over the top of each of the flanges 17 so that the upper edge of each stationary contacting member 29 will due to the resiliency of the spring 28, prevent said receiving member 15 from moving upward from said section 9.

As explained above, the arrangement should be made in such a manner that in the normal position of the parts the contact of each upper movable contacting member 23 of said support 19 is brought into contact with the contact of each upper stationary contacting member 29. Each lower stationary contacting member 30 corresponding to the shape of each L-shaped portion 12 is mounted on each seat 13 on the shoulder 2 which is separated by each partition wall 6. This assembly should be made so that the conduct of said contacting member 30 is opposite a contact of the lower movable contacting member 24 of said support 19.

The foregoing explanation relates to electromagnetic relay providing A, B contacts.

Figure 4:
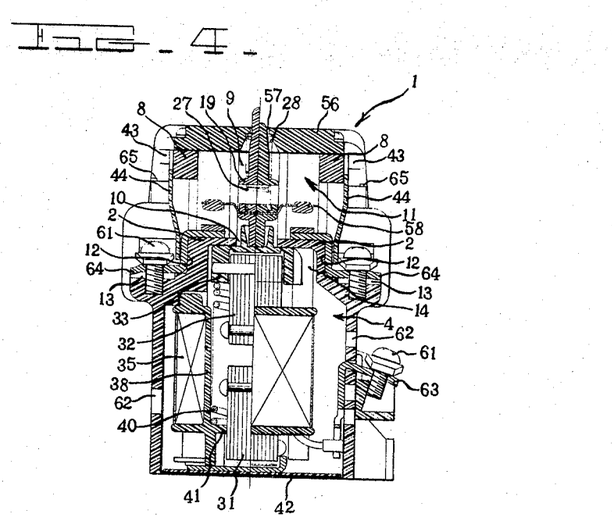
FIG. 4 shows in cross section an electromagnetic relay provided with an A contact embodying the invention as viewed along the line A–B–O–C in FIG. 6.
Figure 5:
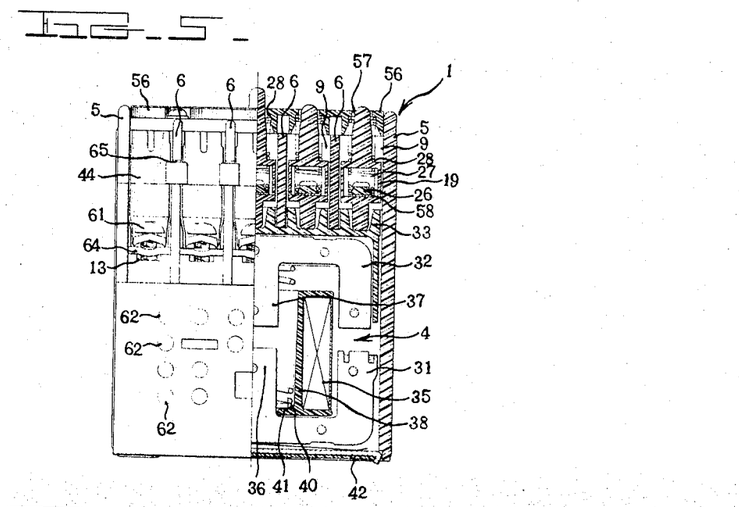
FIG. 5 is a view of the relay of FIG. 4 in cross section as viewed along the line C–O–D in FIG. 6.
Figure 6:
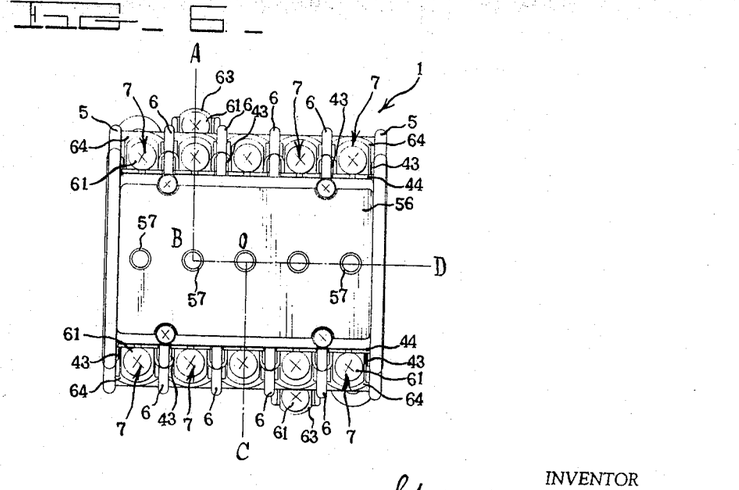
FIG. 6 is a plan view of an electromagnetic relay embodying the invention shown in FIG. 4.

In FIGS. 4 to 6, the electromagnetic relay providing only an A contact is illustrated.

The construction of the electromagnetic relay shown therein is identical with that shown in FIGS. 1 to 3 except for the following construction.

The upper stationary contacting member 29, the upper movable contacting member 23 and the spring receiving member 15 are omitted. Furthermore, unlike in the electromagnetic relay having A, B contacts, in the electromagnetic relay with only an A contact, the movable contacting member support 19, as shown in FIG. 8, has only one movable contacting member 58. The relay of this type is also provided with a holding member 56 (FIG. 10) which keeps the movable contacting member suport 19 in place. It is removably mounted by means of screws, upon the upper surface of the connecting member 8. Each guiding rod 21 is inserted into each threaded hole 57 in said member 56. Said member 56, of course, covers the upper open end of said each cavity 7.

Referring, now to FIGS. 1, 8 and 13, (the following construction is common to electromagnetic relays with A, B contacts as well as those with A contact, the numeral 31 indicates an E-shaped stationary core, and the numeral 32, an E-shaped movable core, upon which a core cap 33 is mounted. The movable core 32 is mounted in the above mentioned recessed section 14. The core cap 33 is provided with recessed portions 34 into which downwardly projecting rods 22 of said supoprts 19 are respectively inserted. The numeral 35 indicates an electromagnetic coil. Upon the energizaiton of said electromagnetic coil 35 the movable core 32 is attracted toward the stationary core 31, whereby each of the movable contacting member supports 19 is depressed by the resiliency of each spring 28, permitting each lower movable contacting member 24 to contact the respective lower stationary contacting members 30. Within the central hole 39 of the coil frame 38 where the central legs 36 and 37 of the cores 31 and 32 are located, a returning spring 40 is positioned so as to encircle said legs 36 and 37. The spring 40 keeps said support 19 and the movable core 32 pressed up against the resiliency of said spring 28. Along the inner edge of the central hole 39 of the coil frame 38 a pair of flanges 41 is formed, and the arrangement is such as to allow the lower end of the returning spring 40 to come in contact with the flange 41, the upper end thereof being in contact with the movable core 32. The magnet unit comprising both cores 31 and 32 is entirely enclosed within the lower space 4 of case 1 the bottom of which is closed by the floor 42.

As already illustrated, movable contacting member supports 19 having said movable contacting members therein are provided, each pressing directly on the movable core 32 of eletcromagnetic unit through the resiliency of the springs 28, and upon energization of the electromagnetic unit said supports are made to move downward by the resiliency of the spring 28. Therefore unlike the conventional method of connecting the movable contacting member support and the movable core by a pin so that upon the energization of the magnetic unit the latter may pull down the former, the device of this invention can substantially eliminate the damage to the movable contacting member support. Improper contact and other erroneous operations owing to any deformity in the movable contacting support can be completely prevented, and the life of the electromagnetic relays will be prolonged.

Furthermore, according to the invention, movable contacting member supports of the same shape are mounted respectively in each section 9 of cavity 7 in the upper space 3 and the electromagnetic unit is positioned in the lower space 4, while said supports and said electromagnetic unit are connected only in a pressure transmitting relation. The lower stationary contacting members 30 are also fixed on each of the seats 13 on the L-shaped portion 12 of the case 1. In consequence, by a simple removal of the upper stationary contacting member 29 mounted on the connecting member 8, and the receiving member 15, the maintenance, inspection and replacement of the movable contacting member support 19 and movable contacting member are readily effected without disassembling the entire body of the electromagnetic relay. Accordingly, when any movable contacting member is found defective, only the support holding the defective movable contacting member need be removed for the replacement of said member held therein, without disturbing the other supports which have normally operating movable contacting members.

Further, according to the invention, as the movable contacting members and the supoprts thereof are replaceable from above the electromagnetic relay, the replacement is extremely readily effected even when a number of relays are mounted on control panels and the like. And the relays can be manufactured in the same exterior shape as the conventional type.

As already mentioned, according to the invention, since the returning spring 40 is provided between two cores 31 and 32, stationary and movable, around the central legs 36 and 37, only one spring is sufficient and for the installation of the returning spring a spring receiving member heretofore necessary on the core side is not required. In this respect, the relay of the invention is simplified and made compact as compared with the conventional type. The resiliency of the returning spring exerted on the flanges 41 formed along the central hole 39 of the coil frame 38 pushes said frame 38 against the stationary core 31 so as to keep it resiliently positioned.

Furthermore, as returning spring 40 is only a single spring when the contacts of movable contacting members perform switching it can exert a uniform contact pressure on each movable contacting member, thus greatly reducing the wear of the contacts.

Figure 12:
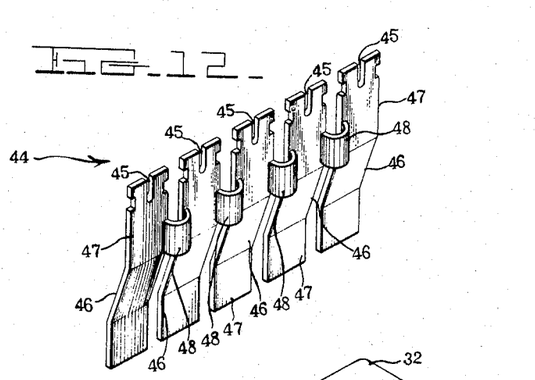
FIG. 12 is a perspective view of a dust-proof cover embodying the invention.

Referring, now, to FIGS. 1 and 12, (the following structure is common to the electromagnetic relay with A, B contacts and the one with only an A contact), respectively on the side of each of side walls 5, 5 and partition walls 6, 6, 6 and 6, a protrusion 43 is formed integrally therewith. Over the one open side of individual cavities 7 separated by each partition wall 6, and over the other as well, a pair of dust-proof covers 44 is mounted, respectively. Each cover 44 is made of resilient material such as polycarbonate resin and the like and is fitted into the open side of each of cavities 7. The cover 44 comprises plate pieces 47, and every two plate pieces adjacent to each other are connected by protruding conection 48. A slit 45 is formed at one end of each piece and also a specific portion standing on different levels 46 thereat. The cover 44 may be placed on the case 1 by keeping one end thereof in touch with the upper surface of a stationary contacting member 30, pressing the both edges of each plate piece 47 at the other end with slit 45 to narrow the width thereof, and then inserting each piece 47 between protrusions 43 and 43 which are respectively formed on partition walls 6 and side walls 5.

The dust-proof cover 44 thus inserted is brought back to shape by the resiliency thereof and the removal of the cover from said case is positively prevented. Once the cover 44 is mounted in case 1, as shown in FIG. 1, the insertion of protruding connections 48, 48, 48 and 48 into recessed portions 65 respectively provided in partition walls 6, 6, 6 and 6 positively preclude the upward movement of the cover 44 or the downward removal thereof in case the electromagnetic relay should be installed upside down. Although the dust-proof cover consists of several plate pieces, a different cover in the form of a single plate piece may also be used. The two dust-proof covers 44 and 44 are respectively provided over both sides of the case 1. Instead of the protrusions 43 respectively formed on side walls 5 and partition walls 6, penetrating holes or recessed portions may be provided therein, and protrusions may be provided on the corresponding sections of dust-proof covers 44 for engagement.

According to the invention, the protrusions 43 formed on each side of partition walls partitioning the terminal screw 49 of each stationary contacting member hold in engagement the dust-proof cover of resilient material, so that in applying or removing the dust-proof covers to the case, it is not necessary to loosen or remove each terminal screw 49. Said cover need only be pressed into the case 1 for mounting, while the removal thereof is readily effected by pulling it out. Possible troubles affecting the operation of the stationary contacting member which are heretofore likely to be found can also be avoided. The dust-proof cover of the invention which keeps the contacting assembly in the case protected against dust, water droplets and other impurities and contributes to a marked reduction of troubles in the electromagnetic relay of the invention, thus creating an extended life.

Figure 9:
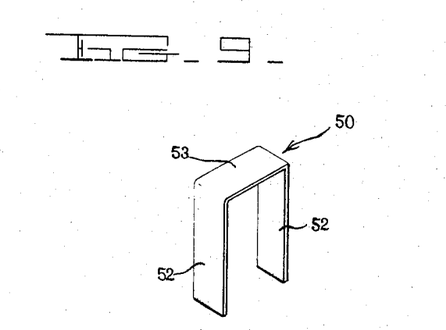
FIG. 9 is a perspective view of an arc shielding member used in an electromagnetic relay embodying the invention.
Figures 10, 11:
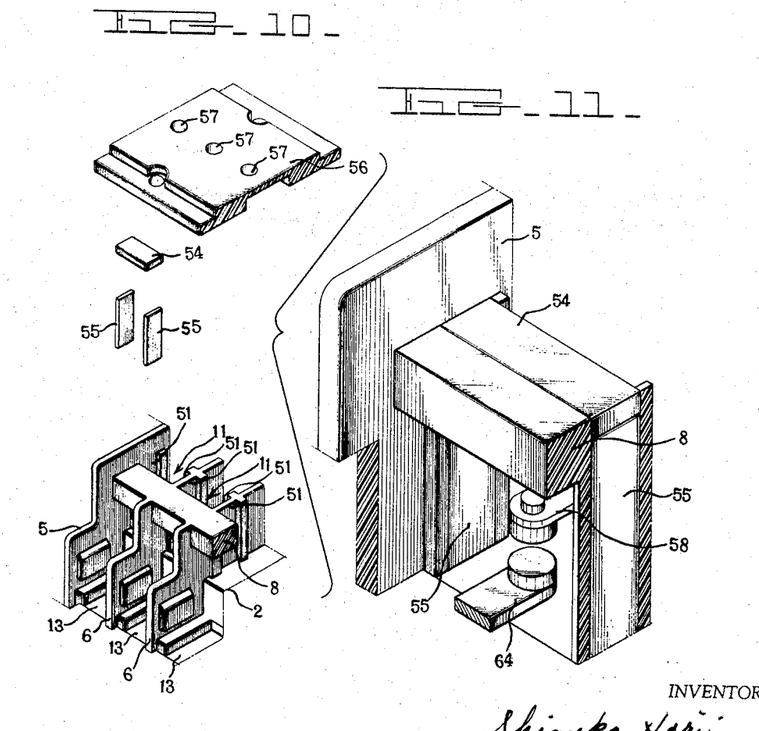
FIG. 10 is a partly sectional perspective view of a disassembled arc shielding member having a permanent magnet according to the invention.
FIG. 11 is a partly sectional perspective view in elevation of an arc shielding member, shown in FIG. 10, installed in a case.
Figure 11:
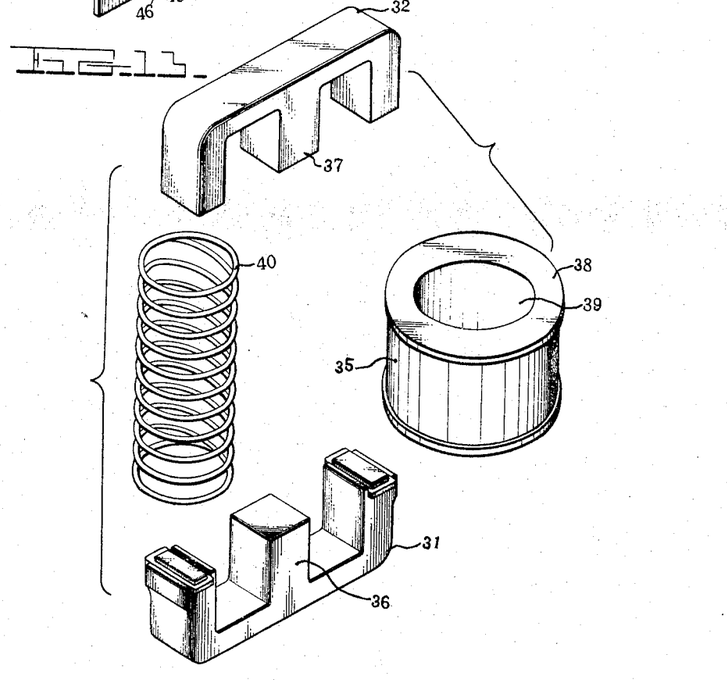

Referring to FIGS. 9 to 11, (the following construction relates to the electromagnetic relays with an A contact), two sections 11 and 11 for receiving arc shielding members are provided on the both sides of each cavity 7 in said case 1 interposed between said sections, and in each of said sections 11 arc shielding members 50 are provided, each respectively. Each partition wall 6 forming individual said sections 11 has a recessed portion 51 for receiving the arc shielding member. The reverse U-shaped arc shielding member 50 is a magnetic body having a pair of legs 52, 52 and a connection 53 connecting said legs. Both legs 52, 52 are respectively placed in each of said recessed portions 51 and 51. Both legs 52, 52 are mounted so as to be disposed on both sides of the movable contacting member 58 and the stationary contacting member 64. The arc shielding member having a construction different from the one described above consists, as seen in FIGS. 10 and 11, of a connection 54 of a permanent magnet and legs 55 and 55 of magnetic material with the legs 55 and 55 connected by the connection 54.

When an arc is generated upon contact switching, according to the invention, since a recessed portion 51 is respectively formed in partition walls 6, 6, 6 and 6 partitioning movable and stationary contacting members and the legs 55 are inserted in each recessed portion 51 and each pair of legs 55 and 55 connected by connection 54 in the form of a permanent magnet, the magnetic flux of the permanent magnet 55 conducted close to the contact by the pair of legs 55 and 55 can effectively extinguish the arc which is generated in contact switching. The connection (permanent magnet) 54 and a pair of legs 55 and 55 which extinguish arc can be inserted in each section 11 from above the case 1, in the same direction as when the movable contacting member supports 19 are mounted, and the permanent magnet 54 and a pair of legs (magnetic bodies) 55 and 55 are arranged so as to be held in said section by the holding member 56 (FIG. 10) at the same time said movable contacting member support 19 is held in place thereby. Therefore, it is not necessary to employ an additional member for fastening the connection 54, and as a result, the assembly can be effected extremely simply and easily. Said holding member 56 made of insulating material is provided with threaded holes 57 for receiving the guiding rod. Said legs (magnet bodies) are inserted into said recessed portions formed on the sides of partition walls separating movable and stationary contacting members, and said legs being connected to each other through the permanent magnet, and thus both said permanent magnet and magnet bodies are securely held by said holding member in said section. Therefore, according to the present invention, the arc generated upon contact switching is effectively extingushed by the magnetic flux and also the life of the contacts is extended, even though the contacting force is greatly increased.

As compared with a compact electromagnetic relay of the conventional type having no arc extinction unit, the present invention has recessed portions in the side of the partition walls, a skillful device to utilize the space which is unused in conventional relays. Thus, the formation of the recess portions makes unnecessary the expansion in the size of the case; an electromagnetic relay with larger contacting capacity in a compact form can now be provided.

The installation (setting) of the permanent magnet and magnetic bodies in one direction also ensures an extremely easy and simple assembly procedure. Furthermore, instead of a direct arrangement of a permanent magnet close to the contact, the permanent magnet (connection) is so constructed as to conduct the magnetic flux near the contact and extinguish the arc, thereby the degeneration of the permament magnet by the arc being avoided.

The numeral 59 designates a terminal indicating plate shown in FIG. 3, and the numeral 60 a transparent cover over said plate, which is disposed between the pair of side walls 5, 5 with both ends thereof inserted into the narrow space formed between each side wall 5 and the spring receiving member 15 adjacent to said wall. The numeral 61 designates a terminal screw for each stationary contacting member, 62, holes for air outlet respectively in the front and rear of the lower space 4, and 63, a terminal for exciting coil 35.

What I claim is:

1. An improved electromagnetic relay for switching, an electric circuit, comprising a single case of insulating material and having a shoulder therein dividing the interior into an upper space and a lower space, partition walls extending upward from the shoulder dividing said upper space into a plurality of cavities, a movable contacting member support in each cavity which is movable vertically along said partition walls in a reciprocating motion, an element receiving section in each of said supports, an upper movable contacting member and a lower movable contacting member removably mounted in said element receiving section, a first spring interposed between said movable contacting members and holding said movable contacting members in position so that they are each separately replaceable without disturbing the other, lower stationary contacting members mounted, respectively, on the shoulder opposite respective lower movable contacting members and separated by partition walls, second springs respectively engaging each movable contacting member support and pressing each movable contacting member support, an electromagnetic unit having a movable core in said lower space, a core cap mounted on the movable core and against which said movable contacting member supports are urged by said second springs, connecting members connecting the partition walls above said shoulder, spring receiving members receiving the free ends of the respective second springs, said spring receiving members each having a pair of flanges, upper stationary contacting members opposite the upper movable contacting members the removably mounted on said connecting members with the flanges of said receiving members engaged under said upper stationary contacting members so as to prevent the receiving members from moving upward from said upper space.

2. An improved electromagnetic relay as claimed in claim 1 in which said electromagnetic unit also has a stationary core with a central leg, and said electromagnetic unit further has a coil having a central hole therein into which said central leg of said stationary core extends, said movable core also having a central leg extending into said hole, a lower inner flange on the lower inner edge of said coil and extending into said hole, and a returning spring in said hole held between said flange and said movable core and surrounding the central legs of said cores.

3. An improved electromagnetic relay as claimed in claim 1 in which an inverted U-shaped shielding member is provided in association with each pair of movable and stationary contacting members, said shielding members each having a pair of legs and a connecting element connecting said legs, each of said partition walls separating the cavities containing the contacting members having a recess therein extending beside the positions of the contacting members and the legs of the respective shielding members being positioned in said recesses with the free ends of said legs contacting the shoulders and the legs spanning the contact positions of the contacting members in the cavities, and a holding member covering the upper openings of the cavities and removably mounted on the connecting members and holding the connecting element of the shielding member in position.

4. An improved electromagnetic relay as claimed in claim 3 in which said shielding member is integral and is made of magnetic material.

5. An improved electromagnetic relay as claimed in claim 3 in which said legs of said shielding member are separate from said connecting element and are of magnetic material, and said connecting element is a permanent magnet.

6. An improved electromagnetic relay as claimed in claim 1 further comprising a pair of dustproof covers of resilient material covering the open sides of said cavities and which has a plurality of plate pieces positioned adjacent to each other, one for each cavity and connections extending between said plate pieces connecting them to each other, the upper end of each plate piece having a slit therein for accommodating a wire to the upper stationary contacting member, and a protrusion on the upper part of each of said partition walls for engaging the edges of each plate piece and holding the plate piece in place over the cavity.

7. An improved electromagnetic relay for switching an electric circuit, comprising a single case of insulating material and having a shoulder therein dividing the interior into an upper space and a lower space, partition walls extending upward from the shoulder dividing said upper space into a plurality of cavities, a movable contacting member support in each cavity which is movable vertically along said partition walls in a reciprocating motion, an element receiving section in each of said spuports, a movable contacting member removably mounted in said element receiving section so that it can be replaced, stationary contacting members mounted, respectively, on the shoulder opposite respective movable contacting members and separated by partition walls, springs respectively engaging each movable contacting member support and pressing each movable contacting member support, an electromagnetic unit in said lower space and having a stationary core and a movable core, a core cap mounted on the movable core and against which said movable contacting member supports are urged by said springs, connecting members connecting the partition walls above said shoulder, and a spring receiving member receiving the free ends of the respective second springs, said spring receiving member being connected to said connecting members so as to prevent the receiving members from moving upward from said upper space.

References Cited

UNITED STATES PATENTS

| | | |
|---|---|---|
| 2,629,035 | 2/1953 | Yingst. |
| 2,875,302 | 2/1959 | Immel. |
| 3,090,845 | 5/1963 | Kretzschmar. |
| 3,251,964 | 5/1966 | Lawrence _________ 335—132 |
| 3,334,319 | 8/1967 | Herrmann _________ 335—132 |
| 3,377,519 | 4/1968 | Stong ____________ 335—132 |

BERNARD A. GILHEANY, Primary Examiner

H. BROOME, Assistant Examiner